United States Patent [19]

Motomura et al.

[11] Patent Number: 5,045,590

[45] Date of Patent: Sep. 3, 1991

[54] CONSTRUCTION MATERIAL CONTAINING BITUMINOUS SUBSTANCES

[75] Inventors: Masatoshi Motomura; Ichiro Muramatsu, both of Ichihara; Noboru Okoshi, Sodegaura; Yoshitami Araki, Kisai; Takahiko Ito, Chiba; Toru Sato, Sagamihara, all of Japan

[73] Assignee: Dainippon Ink and Chemicals, Tokyo, Japan

[21] Appl. No.: 381,926

[22] Filed: Jul. 19, 1989

[30] Foreign Application Priority Data

Jul. 20, 1988 [JP] Japan .................. 63-180695

[51] Int. Cl.$^5$ ............................................ C08G 18/12
[52] U.S. Cl. .................. 524/705; 524/871; 524/875
[58] Field of Search ........................................ 524/705

[56] References Cited

U.S. PATENT DOCUMENTS

| 3,553,283 | 1/1971 | Doss | 260/830 |
|---|---|---|---|
| 3,732,309 | 5/1973 | Garnish et al. | 260/583 |
| 3,746,685 | 7/1973 | Dobinson et al. | 260/47 EC |
| 3,916,067 | 10/1975 | Jones et al. | 428/411 |
| 4,153,586 | 5/1979 | Hockswender et al. | 260/118 |
| 4,626,562 | 12/1986 | Motomura et al. | 523/466 |

Primary Examiner—Maurice J. Welsh
Assistant Examiner—Rachel F. Johnson
Attorney, Agent, or Firm—Armstrong, Nikaido, Marmelstein, Kubovcik & Murray

[57] ABSTRACT

Disclosed is a construction material containing bitumen comprising (A) a polyol component, the polyol component consisting essentially of (a-1) a hydroxy-polyoxyalkylene ether of bisphenol A and/or bisphenol F. and (a-2) an aliphatic polyol, (B) a polyisocyanate component, (C) a bitumen, and/or (D) an aggregate. The construction material has improved water-proof and mechanical properties.

14 Claims, No Drawings

CONSTRUCTION MATERIAL CONTAINING BITUMINOUS SUBSTANCES

BACKGROUND OF THE INVENTION

The present invention relates to new materials for use in construction. More specifically, the present invention relates to construction materials consisting of a polyol component, polyisocyanate component and bitumen and/or aggregate, the polyol component comprising hydroxy-polyoxyalkylene ether of bisphenol A and/or bisphenol F and aliphatic polyol, and the bitumen being contained in a three dimensional structure and having excellent water-proof and mechanical properties.

Conventional non-solvent urethane resin compositions having water-proof and mechanical properties include those containing good polyol components such as polyether polyols, polyester polyols and aliphatic polyols including castor oil, modified castor oil and polybutadiene polyol. Such non-solvent urethane resin compositions have been used in various water resistant materials, corrosion resistant paints, and floor lining materials and as sealing agents. Furthermore, the water-proof of such compositions can be improved by mixing bitumen thereinto. Such compositions have therefore good commercial possibility as construction materials.

Among the various kinds of bitumen, coal tar materials mix well with non-solvent resin compositions and improve the water-proof of the composition. In some countries, use of coal tar materials is however under governmental control. For instance, in Japan, coal tar materials are designated as hazardous secondary control materials in the regulation relating specified chemical substances. Therefore, from the standpoint of public safety, strict precautions are required in handling coal tar materials.

On the other hand, asphalt materials included in bitumen has poor compatibility with polyol components such as aliphatic polyols, polyether polyol or polyester polyol, which is disadvantageous.

Polybutadiene polyol of aliphatic polyols is compatible with asphalt depending upon the amount of asphalt used. However, the cured composition is too soft, and has mechanical properties insufficient to be used as a construction material.

SUMMARY OF THE INVENTION

Accordingly, it is an object of the present invention to provide a construction material containing bitumen in a three-dimensional structure thereof and having excellent water-proof and mechanical properties.

According to an aspect of the present invention, there is provided a construction material containing bitumen comprising
(A) a polyol component, said polyol component consisting essentially of
(a-1) a hydroxy-polyoxyalkylene ether of bisphenol A and/or bisphenol F, and
(a-2) an aliphatic polyol,
(B) a polyisocyanate component,
(C) a bitumen, and/or
(D) an aggregate.

DETAIL DESCRIPTION OF THE INVENTION

Hydroxy-polyoxyalkylene ether (a-1) of bisphenol A and/or bisphenol F is preferably one which is represented by general formula [I]

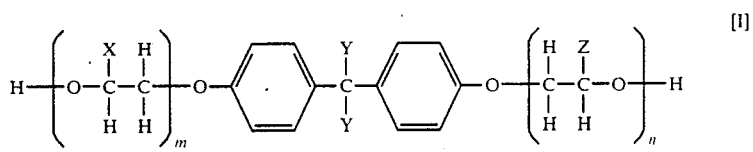

wherein X, Y and Z independently represent a hydrogen atom or a methyl group, and m and n indicates average degree of polymerization, and each represents zero or a positive rational number of less than 3, and the sum of m and n is a rational number between 1.5 and 2.8.

Any of the commercially available aliphatic polyols can be used as aliphatic polyol (a-2). Typical examples of the aliphatic polyol (a-2) include castor oil, modified castor oil which are the products of the interesterification between castor oil and polyhydric alcohols, and polyols which are the products of the esterification reaction of ricinolic acid with polyhydric alcohols, and polybutadiene polyol.

Typical examples of such polyhydric alcohols include ethylene glycol, diethylene glycol, polyethylene glycol, propylene glycol, dipropylene glycol, polypropylene glycol, butanediol, pentanediol, neopentyl glycol, hexanediol, 2,2,4-trimethyl-1,3-pentanediol, trimethylolethane, trimethylolpropane, glycerin, pentaerythritol, dipentaerythritol, sorbitol and the like.

On the other hand, the hydroxypolyoxyalkylene ether (a-1) of bisphenol A and/or bisphenol F is the product of the addition reaction of bisphenol A and/or bisphenol F to ethylene oxide (EO) and/or propylene oxide (PO). For example, there can be cited the adduct of 2 mols of EO to 1 mol of bisphenol A, that of 2 mols of PO to 1 mol of bisphenol A, and that of 2 mols of EO or PO to 1 mol of bisphenol. Among them, the adduct of 2 mols of PO to 1 mol of bisphenol A is preferably used considering the compatibility of the resulting bitumen compound and the mechanical properties of the cured composition. Moreover, as for the polyol component (A) described above, the content of hydroxypolyoxyalkylene ether (a-1) of bisphenol A and/or bisphenol F is within the range of from 20 to 80% by weight, preferably 50 to 70% by weight. When the content is less than 20% by weight, the asphalt tends to bleed when substances having poor compatibility with the asphalt, e.g., castor oil, is used as the aliphatic polyol (a-2). Also, when polybutadiene polyol is used as the aliphatic polyol (a-2), the physical strength of the cured composition is reduced. On the other hand, when the content is in excess of 80% by weight, the cured composition becomes brittle, even though the physical strength is improved. Neither extreme is desirable.

Moreover, the hydroxypolyoxyalkylene ether (a-1) and the aliphatic polyol (a-2) may be used as a simple mixture containing only the two compounds, or a multicomponent mixture containing another components, reaction product thereof.

In order to sufficiently develop three dimensional structure or crosslinking to a desired extent so as to obtain cured compositions having an improved mechanical strength, the aliphatic polyol (a-2) in the polyol component (A) must have on an average at least two hydroxy groups per molecule thereof since the hydroxypolyoxyalkylene ether (a-1) of bisphenols itself has two hydroxy groups per molecule and the aliphatic polyol (a-2) must contain not less than divalents polyols.

The hydroxy group value of the aliphatic polyol (a-2) is within the range of from 25 to 300, preferably from 40 to 250. When the value is less than 25, it is difficult to obtain cured compositions having high physical strength. On the other hand, when the hydroxy group value is in excess of 300, the polarity of the aliphatic polyol (a-2) becomes too high, reducing the compatibility between the aliphatic polyol and asphalt. In this case, cured compositions having high physical strength cannot be obtained.

The above-described polyisocyanate component (B) functions as a curing agent for the polyol component (A). Therefore, aliphatic, alicyclic, and aromatic polyisocyanates, or mixtures thereof can be used as the polyisocyanate component (B).

Typical examples of the aliphatic polyisocyanates include tetramethylene diisocyanate, hexamethylene diisocyanate (HMDI), trimethyl hexamethylene diisocyanate and the like. Typical examples of the alicyclic polyisocyanates are 1,4-cyclohexane diisocyanate, 4,4'-dicyclohexylmethane diisocyanate, isophorone diisocyanate (IPDI) and the like. Typical examples of aromatic polyisocyanates are tolylene diisocyanate (TDI), xylylene diisocyanate (XDI), 4,4'-diphenylmethane diisocyanate (MDI), polyphenylmethane polyisocyanate (non-purified MDI), 4,4'-biphenylene diisocyanate, 1,5-naphthalene diisocyanate, and the like. Moreover, biuret (i.e., imidodicarbonic diamide)-modified polyisocyanates, or trimers of polyisocyanates having an isocyanurate structure can be used. Furthermore, the compounds of the polyisocyanates and polyhydric alcohols described above can also be used. Especially, non-purified MDI is preferably used when the viscosity, workability, and mechanical properties of cured compositions are considered.

The proportion of the polyol component (A) to the polyisocyanate component (B), in terms of the ratio of active hydrogen equivalent to isocyanate equivalent, that is, the ratio of the active hydrogen equivalent in the polyol component (A) to the isocyanate equivalent in the polyisocyanate component (B) is suitably within the range of from 0.5 to 2.0, preferably from 1.0 to 1.4. When the ratio is less than 0.5, the curing tends to be insufficient, and the physical strength of the cured composition is reduced. When it is in excess of 2.0, the mechanical properties of the cured composition are deteriorated significantly.

Commonly used curing catalysts including various amines, organometallic compounds such as dibutyltin dilaurate, dibutyltin acetate, cobalt naphthenate, and zinc naphthenate can be added to the mixture of the polyol component (A) and the polyisocyanate component (B) upon the curing thereof, if desired.

The bitumen (C) include either straight asphalt or straight asphalt diluted with liquid hydrocarbons. Typical examples of the liquid hydrocarbons are heavy oil, light oil, lamp oil, gasoline, engine oil, and vegetable oil.

Bitumen (C) is used in amounts within the range of from 30 to 90% by weight of the total weight of the mixture of the polyol component (A), the polyisocyanate component (B), and the bitumen component (C), preferably within the range of from 50 to 80% by weight. Such a mixing ratio yields cured compositions with excellent water-proof, physical strength, and flexibility.

Typical examples of the aggregate (D) include No. 6 crushed stone and finer aggregates such as No. 7 crushed stone, rough sand, fine sand, crushed sand, quartz sand and stone powder. These aggregates are mixed in amounts within the range of from 80 to 95% by weight, preferably 83 to 90% by weight of the total composition. Such a mixing ratio yields cured compositions with high physical strength.

The construction materials of the present invention are prepared by the following manner. Initially, the hydroxypolyoxyalkylene ether (a-1) of bisphenol A and/or bisphenol F, and the aliphatic polyol (a-2) are subjected to cold blending to thereby prepare the polyol component (A), or the main component of the construction material of the present invention. The thus-prepared polyol component (A) is mixed with the polyisocyanate component (B) as the curing agent containing the bitumen (C) to obtain a resin composition or a construction material. Further, the aggregate (D) is optionally mixed with the above-obtained resin composition.

Also, in the preparation of these construction materials, organic coloring pigments such as carbon black and phthalocyanine blue, inorganic coloring pigments such as titanium oxide, trivalent iron oxide ($Fe_2O_3$), lead chromate and zinc oxide, anticorrosion pigments such as lead oxide ($Pb_3O_4$), calcium plumbate, zinc chromate, basic lead chromate, zinc molybdate and condensed zinc phosphate, fillers such as silica, baryta, calcium carbonate, clay, talc and mica. Furthermore, various kinds of lubricants, moisture absorbents, and couplers such as silane couplers and titanium couplers can be used as an assistant.

The above-explained construction materials according to the present invention has excellent water-proof and mechanical properties. Accordingly, the construction materials can be used as construction materials for the side faces of the waste disposal facilities for disposing general and industrial wastes, or for the side and bottom faces of a storing reservoir, or for periphery the reservoir or the places closeby the reservoir in the land development and creation areas. In these cases, means for construction can be used for casting, flattening, spraying, and other applications.

EXAMPLES

Several preferred embodiments of the present invention will now be described as follows. Parts and percentages are all based on weight unless specified otherwise.

EXAMPLE 1

Castor oil of 1,856 parts and 92 parts of glycerin were subjected to interesterification at a temperature of 220° C. for one hour in the presence of 1.0 part of lithium hydroxide to obtain diglyceride of castor oil having 2.8 hydroxy groups per molecule and having a hydroxy group value of 239. The obtained diglyceride is hereinafter abbreviated as "aliphatic polyol (a-2-1)".

Aliphatic polyol (a-2-1) was cold-blended with 835 parts of Newcol BA-P2 (the adduct of bisphenol A to 2 mols of propylene oxide, made by Nippon Nyukazai Co., Ltd.). To this blend, 6,735 parts of cutback-asphalt (straight asphalt of 60/80 penetration diluted with Type-A heavy oil so that the mixing ratio will be 60:40)

and 1,698 parts of non-purified MDI were added and promptly stirred. At this time, the state of the obtained resin composition was checked. Subsequently, the resin composition was cast in a mold to obtain a cured composition with a desired shape. The cured shaped product was allowed to stand for one week under room temperature, and then subjected to a bending test and water permeation test. The test results are shown in Table.

EXAMPLE 2

The same procedure as in Example 1 was repeated to prepare a blend of aliphatic polyol (a-1-1) and Newcol BA-P2. Subsequently, cutback-asphalt and non-purified MDI were added to the prepared blend to thereby produce a resin composition for construction materials. To 15 parts of the resin composition was added 85 parts of aggregate to produce construction materials containing aggregates. After the state of the construction material with aggregates was checked, the material was cast in a mold to produce a cured composition in a desired shape. The same bending test and water permeation test as in Example 1 were performed. The test results are shown in Table.

EXAMPLES 3 TO 6 AND COMPARISONS 1 TO 7

Construction materials, with aggregates and without aggregates, were prepared as in Example 1, except that the proportions of the components were changed to those shown in Table. Each cured composition was obtained from each construction material. A bending test and a water permeation test were carried out on each cured composition in the same way as in Example 1. Table shows the test results.

Materials used in Examples 1 to 6 and Comparisons 1 to 7 will now be described in detail as follows.

Aliphatic polyol (a-2-2):
Polyol with 2.8 hydroxy groups per molecule and with a hydroxy group value of 234, produced by the interesterification between castor oil and trimethylol propane using the steps in Example 1.

Ricinolic ester:
Polyol with 2.0 hydroxy groups per molecule and with a hydroxy group value of 180, produced by the esterification of ricinolic acid with ethylene glycol and pentaerythritol.

Polybutadiene polyol:
Polyol with an average molecular weight of 2,800, 2.3 hydroxy groups per molecule, and a hydroxy group value of 45.

Polyether polyol:
Polypropylene oxide based polyol with an average molecular weight of 1,000, 2.0 hydroxy groups per molecule, and a hydroxy group value of 112.

Polyester polyol:
1,3-butanediol/adipic-acid based polyol with an average molecular weight of 550, 2.8 hydroxy groups per molecule, and a hydroxy group value of 220.

Aggregate:
The composition of the aggregate is as follows: No. 7 crushed stone/rough sand/fine sand = 10/45/50 (by weight).

Bending test:
The results were as follows:
Dimensions of the rectangular cured composition: 10 mm × 10 mm × 100 mm.
Bending speed: 5 mm/min.
Span: 80 mm.
Permeation coefficient:
The results were as follows:
Water permeation pressure: 0.2 kgf/cm$^2$.

TABLE

| COMPOSITION (Parts) | EXAMPLES | | | | | | COMPARISONS | | | | | | |
|---|---|---|---|---|---|---|---|---|---|---|---|---|---|
| | 1 | 2 | 3 | 4 | 5 | 6 | 1 | 2 | 3 | 4 | 5 | 6 | 7 |
| Newcol BA-P2 | 30 | 30 | 50 | 50 | 70 | 30 | | 100 | | | | 30 | 70 |
| Aliphatic Polyol (a-2-1) | 70 | 70 | | | | | 100 | | | | | | |
| Aliphatic Polyol (a-2-2) | | | | | 30 | | | | | | | 70 | |
| Ricinolic Ester | | | | | | 70 | | | | | | | 30 |
| Polybutadiene Polyol | | | 50 | 50 | | | | | 100 | | | | |
| Polyether Polyol | | | | | | | | | | 100 | | | |
| Polyester Polyol | | | | | | | | | | | 100 | | |
| Non-purified MDI | 61 | 61 | 34 | 34 | 83 | 79 | 58 | 75 | 11 | 27 | 53 | 25 | 150 |
| Cutback-Asphalt | 242 | 242 | 201 | 201 | 275 | 269 | 237 | 263 | 167 | 191 | 230 | 188 | 375 |
| Aggregate | | 2284 | | 1898 | | 2539 | | 2482 | 1575 | | 2170 | | |
| NCO/OH Equivalent ratio | 1.0 | 1.0 | 1.0 | 1.0 | 0.7 | 1.5 | 1.0 | 1.0 | 1.0 | 1.0 | 1.0 | 0.4 | 2.3 |
| Compatibility of Polyol with Pitch | | | #1 | | | | #3 | #1 | #2 | #3 | #3 | #1 | #1 |
| Physical Properties of Cured Composition | | | | | | | | | | | | | |
| Appearance | | | | E | | | B | E | B | B | B | N | V |
| Flexural Strength | | | | | | | | | | | | | |
| Maximum Flexural Strength (kg/cm$^2$) | 20 | 30 | 10 | 20 | 30 | 20 | 5 | 60 | 6 | — | — | — | 15 |
| Elongation at at rupture (mm) | 17 | 6 | 10 | 4 | 6 | 3 | 3 | 0 | 6 | — | — | — | 0 |
| Permeability Coefficient (cm/sec.) | <$10^{-9}$ | <$10^{-9}$ | <$10^{-9}$ | <$10^{-9}$ | $10^{-8}$ | <$10^{-9}$ | $10^{-6}$ | $10^{-7}$ | $10^{-7}$ | — | — | — | $10^{-8}$ |

Notes:
1 stands for good compatibility.
2 stands for little compatibility.
3 stands for no compatibility.
E: Excellent, B: Bleed, N: Not cured, V: Viscous

What is claimed is:
1. A construction material comprising
   (A) a polyol component, said polyol component consisting essentially of
      (a-1) a hydroxy-polyoxyalkylene ether of bisphenol A and/or bisphenol F, and
      (a-2) an aliphatic polyol,
   (B) a polyisocyanate component, and

(C) a bitumen.

2. A construction material comprising
(A) a polyol component, said polyol component consisting essentially of
(a-1) a hydroxy-polyoxyalkylene ether of bisphenol A and/or bisphenol F, and
(a-2) an aliphatic polyol,
(B) a polyisocyanate component,
(C) a bitumen, and
(D) an aggregate.

3. A construction material as claimed in claim 1, wherein said hydroxy-polyoxyalkylene ether (a-1) is represented by general formula [I]

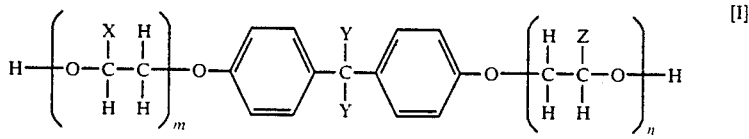

[I]

wherein X, Y and Z independently represent a hydrogen atom or a methyl group, and m and n each represents zero or a positive rational number of less than 3, and the sum of m and n is a rational number between 1.5 and 2.8.

4. A construction material as claimed in claim 2, wherein said hydroxy-polyoxyalkylene ether (a-1) is represented by general fomula [I]

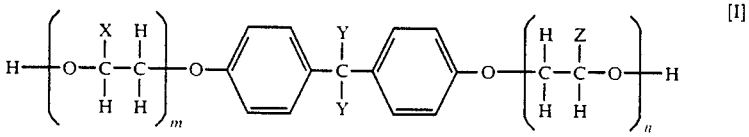

[I]

wherein X, Y and Z independently represent a hydrogen atom or a methyl group, and m and n each represents zero or a positive rational number of less than 3, and the sum of m and n is a rational number between 1.5 and 2.8.

5. A construction material as claimed in claim 1, wherein said aliphatic polyol (a-2) has on an average at least two hydroxyl groups per molecule, and the hydroxyl group value is between 25 and 300.

6. A construction material as claimed in claim 2, wherein said aliphatic polyol (a-2) has on an average at least two hydroxyl groups per molecule, and the hydroxyl group value is between 25 and 300.

7. A construction material as claimed in claim 3, wherein said polyol component (A) consists essentially of 20 to 80% by weight of said hydroxy-polyoxyalkylene ether (a-1) and 80 to 20% by weight of said aliphatic polyol (a-2) having on an average at least two hydroxyl groups per molecule and having the hydroxyl value within the range of 25 to 300.

8. A construction material as claimed in claim 4, wherein said polyol component (A) consists essentially of 20 to 80% by weight of said hydroxy-polyoxyalkylene ether (a-1) and 80 to 20% by weight of said aliphatic polyol (a-2) having on an average at least two hydroxyl groups per molecule and having the hydroxyl value within the range of 25 to 300.

9. A construction material as claimed in claim 3, wherein a ratio of an active hydrogen equivalent in said polyol component (A) to an isocyanate equivalent in said polyisocyanate component (B) is between 0.5 and 2.0.

10. A construction material as claimed in claim 4, wherein a ratio of an active hydrogen equivalent in said polyol component (A) to an isocyanate equivalent in said polyisocyanate component (B) is between 0.5 and 2.0.

11. A construction material as claimed in claim 5, wherein a ratio of an active hydrogen equivalent in said polyol component (A) to an isocyanate equivalent in said polyisocyanate component (B) is between 0.5 and 2.0.

12. A construction material as claimed in claim 6, wherein a ratio of an active hydrogen equivalent in said polyol component (A) to an isocyanate equivalent in said polyisocyanate component (B) is between 0.5 and 2.0.

13. A construction material as claimed in claim 7, wherein a ratio of an active hydrogen equivalent in said polyol component (A) to an isocyanate equivalent in said polyisocyanate component (B) is between 0.5 and 2.0.

14. A construction material as claimed in claim 8, wherein a ratio of an active hydrogen equivalent in said polyol component (A) to an isocyanate equivalent in said polyisocyanate component (B) is between 0.5 and 2.0.

* * * * *

UNITED STATES PATENT AND TRADEMARK OFFICE
CERTIFICATE OF CORRECTION

PATENT NO. : 5,045,590

DATED : September 3, 1991

INVENTOR(S) : Masatoshi MOTOMURA et al

It is certified that error appears in the above-identified patent and that said Letters Patent is hereby corrected as shown below:

On the cover page, Item [73], "Dainippon Ink and Chemicals" should read -- Dainippon Ink and Chemicals, Inc. --.

Signed and Sealed this

Thirty-first Day of March, 1992

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 5,045,590
DATED : September 3, 1991
INVENTOR(S) : Masatoshi MOTOMURA et al It is certified that error appears in the above-identified patent and that said Letters Patent is hereby corrected as shown below:

On the cover page, Item [73], "Dainippon Ink and Chemicals, Tokyo, Japan" should read --Dainippon Ink and Chemicals, Inc., Tokyo, Japan; and Taisei Road Construction Co., Ltd., Tokyo, Japan--.

This certificate supercedes Certificate of Correction issued March 31, 1992.

Signed and Sealed this

Twenty-seventh Day of December, 1994

Attest:

BRUCE LEHMAN

*Attesting Officer*         *Commissioner of Patents and Trademarks*